United States Patent
Kurabayashi

(10) Patent No.: US 9,898,716 B2
(45) Date of Patent: Feb. 20, 2018

(54) SOCIAL NETWORK CONSTRUCTION

(71) Applicant: Empire Technology Development LLC, Wilmington, DE (US)

(72) Inventor: Shuichi Kurabayashi, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 469 days.

(21) Appl. No.: 14/316,916

(22) Filed: Jun. 27, 2014

(65) Prior Publication Data

US 2015/0381668 A1    Dec. 31, 2015

(51) Int. Cl.
*G06F 17/30* (2006.01)
*G06Q 10/10* (2012.01)
*G06Q 50/00* (2012.01)

(52) U.S. Cl.
CPC ............ *G06Q 10/10* (2013.01); *G06Q 50/01* (2013.01)

(58) Field of Classification Search
CPC ..... G06Q 10/10; G06Q 50/01; G06F 17/3089
See application file for complete search history.

(56) References Cited

U.S. PATENT DOCUMENTS

| | | | |
|---|---|---|---|
| 9,143,393 B1* | 9/2015 | Bird | H04L 41/046 |
| 2008/0031203 A1† | 2/2008 | Bill | |
| 2010/0014657 A1 | 1/2010 | Kerschbaum et al. | |
| 2010/0138443 A1† | 6/2010 | Ramakrishnan et al. | |
| 2010/0226284 A1 | 9/2010 | Bill | |
| 2012/0265703 A1 | 10/2012 | Basra et al. | |
| 2012/0290565 A1* | 11/2012 | Wana | G06F 17/3089 707/723 |
| 2013/0097180 A1 | 4/2013 | Tseng | |
| 2013/0103765 A1 | 4/2013 | Papakipos et al. | |
| 2014/0012918 A1* | 1/2014 | Chin | G06Q 50/01 709/204 |
| 2015/0049871 A1* | 2/2015 | Xie | H04W 12/08 380/270 |
| 2015/0142953 A1* | 5/2015 | Bayen | G06F 11/34 709/224 |

FOREIGN PATENT DOCUMENTS

CN    101860859 A    10/2010

OTHER PUBLICATIONS

"Akamai Reveals 2 Seconds as the New Threshold of Acceptability for eCommerce Web Page Response Times," Akamai, accessed at http://web.archive.org/web/20140212212815/http://www.akamai.com/html/about/press/releases/2009/press_091409.html, Sep. 14, 2009, pp. 1-3.

(Continued)

*Primary Examiner* — Dinku Gebresenbet
(74) *Attorney, Agent, or Firm* — Brundidge & Stanger, P.C.

(57) ABSTRACT

Technologies are generally described for constructing an ad-hoc social network. In some examples, a method performed under control of an end device may include calculating a social relevance on a social graph between the end device and another end device, based on a social graph bit array of the end device and a social graph bit array of the other end device; determining that the calculated social relevance is greater than a predetermined threshold value; and constructing an ad-hoc social network that connects the end device with the other end device.

15 Claims, 6 Drawing Sheets

(56) References Cited

OTHER PUBLICATIONS

"Your smartphone. Our camera. The perfect match for stunning image quality," Sony, accessed at http://web.archive.org/web/20140409053716/http://www.sony.net/Products/di/en-gb/products/ec8t/, accessed on Jun. 4, 2014, pp. 1-14.

Bloom, B.H., "Space/Time Trade-offs in Hash coding with Allowable Errors," Communications of the ACM, vol. 13, No. 7, pp. 422-426 (1970).

Bruck, J., et al., "Weighted Bloom filter," IEEE International Symposium on Information Theory, pp. 2304-2308 (2006).

Juan, L., and Khan, S.U., "MobiSN: Semantics-based Mobile Ad Hoc Social Network Framework," Global Telecommunications Conference, GLOBECOM 2009. IEEE, pp. 1-6 (2009).

Liu, Z., et al., "Clustering Coefficient Queries on Massive Dynamic Social Networks," WAIM'10 Proceedings of the 11th international conference on Web-age information management, vol. 6184, pp. 115-126, Springer-Verlag Berlin Heidelberg (2010).

Shankar, P., et al., "SBone: Personal Device Sharing Using Social Networks," Rutgers University, Department of Computer Science, Technical Report DCS-TR-666, pp. 1-9 (Feb. 2010).

Watanabe, C., and Arai Y., "Privacy-Preserving Queries for a DAS Model Using Encrypted Bloomfilter," Proceedings of International Conference on Database Systems for Advanced Applications, vol. 5463, pp. 491-495 (2009).

Yang, Z., et al., "E-SmallTalker: A Distributed Mobile System for Social Networking in Physical Proximity," IEEE 30th International Conference on Distributed Computing Systems, pp. 468,477 (2010).

\* cited by examiner
† cited by third party

FIG. 2A

| 1 | 2 | 3 | 4 | 5 | 6 | 7 | ... | 9997 | 9998 | 9999 | 10000 |
|---|---|---|---|---|---|---|-----|------|------|------|-------|
| 0 | 0 | 0 | 0 | 0 | 0 | 0 |     | 0    | 0    | 0    | 0     |

| 201 | 202 | 203 | 204 | 205 | 206 | 207 | ... | 208 | 209 | 210 | 211 |
|-----|-----|-----|-----|-----|-----|-----|-----|-----|-----|-----|-----|
| 1   | 2   | 3   | 4   | 5   | 6   | 7   |     | 9997| 9998| 9999| 10000|
| 0   | 1   | 0   | 0   | 1   | 0   | 1   |     | 0   | 1   | 0   | 0   | hash_k+1 (john@example.com) → 5
hash_k+2 (john@example.com) → 2
hash_k+3 (john@example.com) → 9998
hash_k+4 (john@example.com) → 7

FIG. 2C

| 201 | 202 | 203 | 204 | 205 | 206 | 207 | ... | 208 | 209 | 210 | 211 |
|-----|-----|-----|-----|-----|-----|-----|-----|-----|-----|-----|-----|
| 1   | 2   | 3   | 4   | 5   | 6   | 7   |     | 9997| 9998| 9999| 10000|
| 1   | 1   | 0   | 1   | 1   | 0   | 1   |     | 0   | 1   | 1   | 0   | hash_k+1 (scott@example.com) → 1
hash_k+2 (scott@example.com) → 9999

FIG. 2D

| 201 | 202 | 203 | 204 | 205 | 206 | 207 | ... | 208 | 209 | 210 | 211 |
|-----|-----|-----|-----|-----|-----|-----|-----|-----|-----|-----|-----|
| 1   | 2   | 3   | 4   | 5   | 6   | 7   |     | 9997| 9998| 9999| 10000|
| 1   | 1   | 1   | 1   | 1   | 0   | 1   |     | 0   | 1   | 1   | 0   | hash_k+1 (jack@example.com) → 3

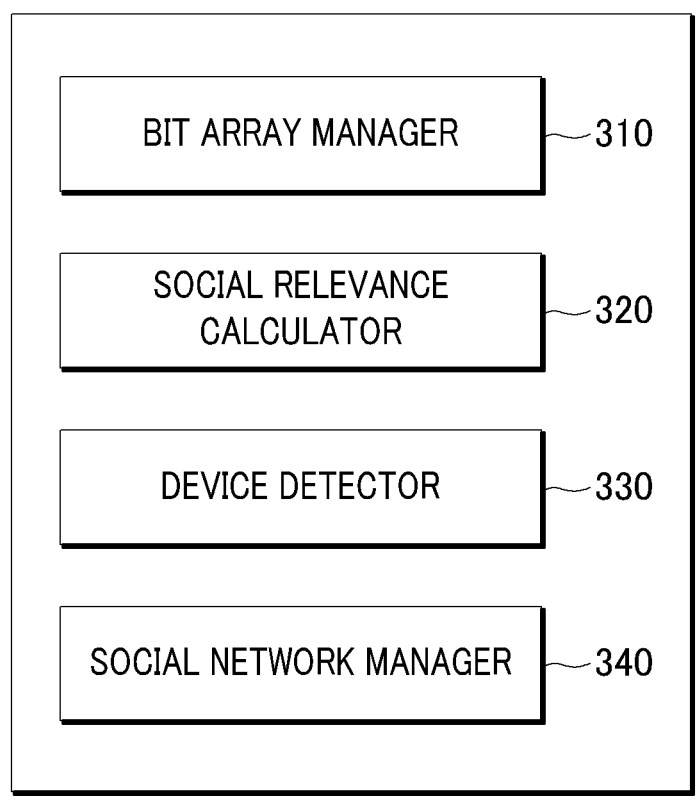

SOCIAL NETWORK CONSTRUCTION

BACKGROUND

A social graph is a social structure that may include nodes that connect together via edges or ties to show some sort of interdependency or relationship between the nodes. For example, the nodes may represent people, organizations, or other sorts of entities. The edges between the nodes may represent interdependency or a relationship between the nodes, such as friends, co-workers, values, visions, dislikes, and/or the like.

SUMMARY

In an example, a method performed under control of an end device may include calculating a social relevance on a social graph between the end device and another end device, based on a social graph bit array of the end device and a social graph bit array of the other end device; determining that the calculated social relevance is greater than a predetermined threshold value; and constructing an ad-hoc social network that connects the end device with the other end device.

In another example, an end device may include a social relevance calculator configured to calculate a social relevance on a social graph between the end device and another end device, based on a social graph bit array of the end device and a social graph bit array of the other end device; a device detector configured to determine that the calculated social relevance is greater than a predetermined threshold value; and a social network manager configured to construct an ad-hoc social network that connects the end device with the other end device.

In yet another example, a computer-readable storage medium having stored thereon computer-executable instructions that, in response to execution, may cause an end device to perform operations including: calculating a social relevance on a social graph between the end device and another end device, based on a social graph bit array of the end device and a social graph bit array of the other end device; determining that the calculated social relevance is greater than a predetermined threshold value; and constructing an ad-hoc social network that connects the end device with the other end device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 2A to 2D schematically show illustrative example social graph bit arrays, arranged in accordance with at least some embodiments described herein;

FIG. 3 shows a schematic block diagram illustrating an example architecture for an end device, arranged in accordance with at least some embodiments described herein;

DETAILED DESCRIPTION

Figure 1:
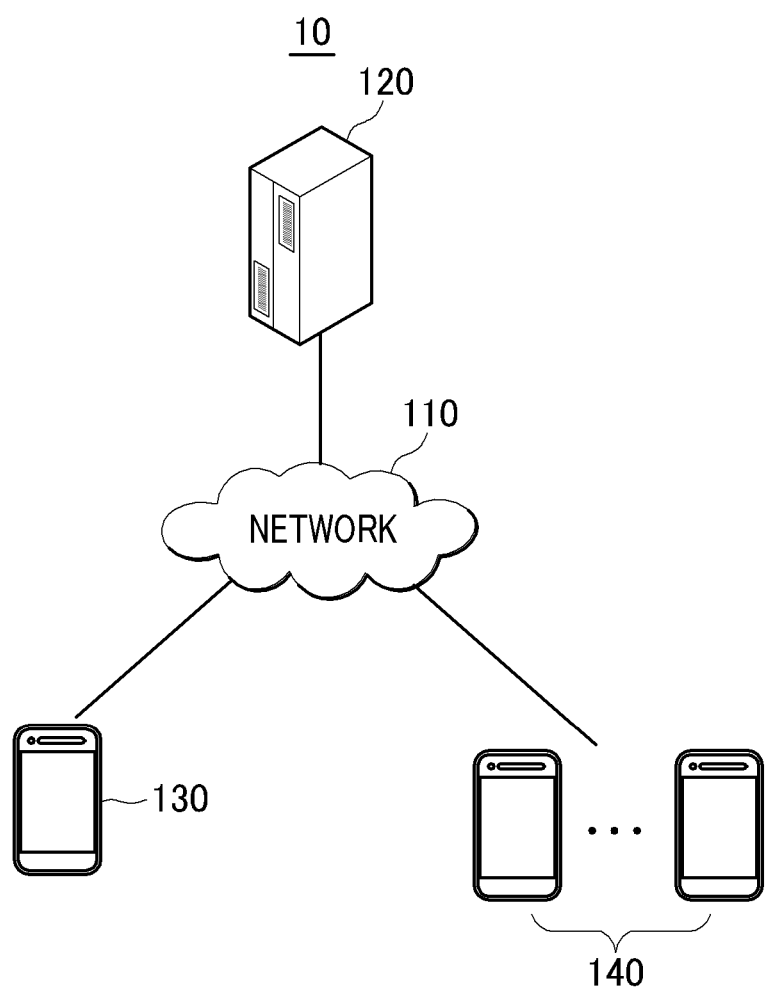
FIG. 1 schematically shows an illustrative example of an environment including a server, an end device and multiple other end devices, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to an ad-hoc social network constructing scheme. Technologies are generally described for a method for computing a social relevance on a social network service (SNS) between multiple end devices by using social graph bit arrays that correspond to each of the multiple end devices and constructing an ad-hoc social network based on the computing result. Thus, it is possible to quickly discover devices having relatively greater or closer social relationship on the SNS, and to construct an ad-hoc social network without high-latency input-output (I/O) processes.

In some examples, an end device may be configured to receive, from a social network service (SNS) cloud server, a social graph bit array of the end device. The social graph bit array may be a bit array into which a social graph corresponding to the end device on a social network service (SNS) may be translated by the SNS cloud server. A length of the social graph bit array may be determined in accordance with the number of users on the SNS. For example, the social graph bit array may have 4,294,967,295 bits which are the greatest value in a 32-bit unsigned integer format. As referenced herein, the social graph may be a social structure that may show interdependency or relationship between multiple devices or users on the SNS.

The end device may be further configured to receive, from other end devices, via an ultralow-voltage wireless network such as a Bluetooth Low Energy (BLE) network, social graph bit arrays of each of the other end devices. The end device may be still further configured to calculate a social relevance or social relationship degrees on the social graph between the end device and respective one of the other end devices, based on the social graph bit array of the end device and the social graph bit arrays of the other end devices. Specifically, the end device may be configured to execute a bitwise logical operation to the social graph bit array of the end device and respective one of the social graph bit arrays of the other end devices. For example, the bitwise logical operation may include AND operation or XOR operation.

The end device may be further configured to determine whether the calculated social relevance is greater than a predetermined threshold value. The end device may be further configured to detect one or more end devices having a social relevance greater than the predetermined threshold value from among the other end devices. The end device may be still further configured to display identifiers of the detected one or more end devices on a display that may be part of, or communicatively coupled to, the end device. Further, the end device may be configured to receive a user input to select one or more of the displayed identifiers. Then, the end device may be configured to construct an ad-hoc social network that may connect the end device and one or more devices of which the identifiers are selected.

FIG. 1 schematically shows an illustrative example of an environment 10 including a server 120, an end device 130 and multiple other end devices 140, arranged in accordance with at least some embodiments described herein. As illustrated in FIG. 1, server 120, end device 130 and other end devices 140 may be communicatively connected to each other via a network 110.

Network 110 may include, as non-limiting examples, wireless networks such as a mobile radio communication network, including at least one of a 3rd generation (3G) mobile telecommunications network, a 4th or 5th generation mobile telecommunications network, various other mobile telecommunications networks, a satellite network, WiBro (Wireless Broadband Internet), Mobile WiMAX, HSDPA (High Speed Downlink Packet Access), Bluetooth, Bluetooth Low Energy (BLE) network, or the like.

As non-limiting examples, server 120 may refer to one or more apparatuses or servers hosted and/or supported by a service providing organization or entity that provides social networking services to end device 130 and other end devices 140. Server 120 may exist on a cloud layer.

Respective one of end device 130 and other end devices 140 may include, for example, but not as a limitation, a notebook computer, a personal computer, a smart phone, a smart television, a digital camera, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

In some embodiments, end device 130 may be configured to receive, from server 120, a social graph bit array of end device 130. Further, end device 130 may be configured to cache and/or store the received social graph bit array in a memory. The social graph bit array may be a bit array into which a social graph of end device 130 on a social network service is translated.

Server 120 may be configured to translate social graphs corresponding to each end device into social graph bit arrays of each end device, and to transmit the social graph bit arrays to each end device. The social graph bit array may have multiple slots. For example, two types of bit (e.g., one or zero) may be inserted or set in each slot of the social graph bit array. A length of the social graph bit array (i.e., a number of the slots) may be determined in accordance with a number of users on the SNS. For example, the social graph bit array may have 4,294,967,295 slots which are the greatest value in a 32-bit unsigned integer format.

In some embodiments, for the purpose of translating a social graph into a social graph bit array, server 120 may be configured to add an element of a social graph into 'k' number of hash functions. The 'k' may be an integer. As non-limiting examples, the element of a social graph may include a mail address or an identifier of each user or end device. Further, server 120 may be configured to set a valid bit (e.g., one) into one or more slots of the social graph bit array, which correspond to results of the 'k' number of hash functions.

Further, server 120 may be configured to assign weights to the social graph bit array of end device 130 in accordance with the social distance or frequency of communications on the SNS between end device 130 and other end devices 140. In some embodiments, for the purpose of assigning weights, server 120 may be configured to enter each element (e.g., a mail address or an identifier of respective one of other end devices 140) into from (k+1)-th hash function to (k+p)-th hash function. The 'p' may be an integer, and may be increased as the social distance or frequency of communications on the SNS between end device 130 and respective one of other end devices 140 increases. Further, server 120 may be configured to set a valid bit (e.g., one) into one or more slots of the social graph bit array, which correspond to a result of the 'p' number of hash functions. Server 120 may be configured to set valid bits into one or more slots of the social graph bit array with regard to at least one of acquaintances on the social graph or a frequency of interactions with the acquaintances. Thus, the social graph bit array of end device 130 may have multiple valid bits which are proportional to at least one of a number of the acquaintances on the social graph or a frequency of interactions with the acquaintances.

End device 130 may be further configured to receive social graph bit arrays of other end devices 140 from other end devices 140. End device 130 may be configured to receive the social graph bit arrays via an ultralow-voltage wireless network between end device 130 and other end devices 140. As non-limiting examples, the ultralow-voltage wireless network may include a Bluetooth Low Energy (BLE) network.

End device 130 may be further configured to calculate a social relevance or a social distance on a social graph of end device 130 between end device 130 and other end devices 140, based on the social graph bit array of end device 130 and the social graph bit arrays of other end devices 140. As referenced herein, the social relevance or social distance may refer to degrees or levels to indicate how many or frequently social activities or social communications between multiple end devices on the SNS happen or to indicate how strongly or close multiple end devices are related or tied each other on the SNS.

In some embodiments, end device 130 may be configured to apply bitwise logical operations to the social graph bit array of end device 130 and the social graph bit arrays of other end devices 140 so as to calculate the social relevance. For example, but not as a limitation, the bitwise logical operations may include AND operation or XOR operation. Specifically, end device 130 may be configured to apply bitwise logical operations, such as AND operation, to the social graph bit array of end device 130 and respective one of the social graph bit arrays of other end devices 140.

Further, end device 130 may be configured to count a number of slots in which a valid bit (e.g., one) is set as a result of the AND operation. End device 130 may be configured to identify and/or determine that the greater the number of slots in which a valid bit (e.g., one) is set is, the greater or closer the social relevance between end device 130 and respective one of other end devices 140 is.

In some embodiments, end device 130 may be configured to calculate a social relevance associated with one social graph bit array "a1" and another social graph bit array "a2" by using the below formula 1. In the formula 1, "a" may refer to a bit array resulting from the bitwise logical operations, such as AND operation, between the social graph bit array "a1" and the social graph bit array "a2". Further, "a'$_{[i]}$" may refer to i-th bit of the bit array a'. Further, "bitratio(a)" may refer to a value in a range from zero to one that may represent a ratio of bits at which a valid bit (e.g., one) is set in the bit array "a".

$$\text{relevance}(a_1, a_2) := \left. \frac{\sum_{i}^{n} a'_{[i]}}{bitratio(a_1) + bitratio(a_2)} \right| a' \leftarrow a_1 \text{ AND } a_2 \quad \text{[formula 1]}$$

Further, end device 130 may be configured to determine whether the calculated social relevance is greater than a predetermined threshold value. For example, end device 130 may be configured to determine whether the counted number of slots in which a valid bit (e.g., one) is set is greater than a predetermined threshold value. For another example, end device 130 may be configured to determine whether a numerical value produced by the formula 1 is greater than a predetermined threshold value.

End device 130 may be further configured to detect one or more end devices having a social relevance greater than the predetermined threshold value from among other end devices 140. End device 130 may be configured to display a notification to indicate the detection of the one or more devices. End device 130 may be further configured to display identifiers of the detected one or more end devices on a display that may be part of, or communicatively coupled to, end device 130. In some embodiments, end device 130 may be configured to display the identifiers of the detected one or more end devices on the display in a descending order of the social relevance corresponding to each of the detected end devices.

Further, end device 130 may be configured to receive a user input to select one or more of the displayed identifiers. End device 130 may be further configured to construct an ad-hoc social network that may connect end device 130 and the one or more end devices, from among end devices 140, of which the identifiers are selected, based on the received user input.

FIGS. 2A to 2D schematically show illustrative example social graph bit arrays, arranged in accordance with at least some embodiments described herein. Server 120 may be configured to translate a social graph corresponding to end device 130 into a social graph bit array. For example, as depicted in FIG. 2A, a social graph bit array 200 may have ten thousand slots. Social graph bit array 200 may be in an initial state in which zero is inserted or set in all of the ten thousand slots of social graph bit array 200.

Further, server 120 may be configured to add an element into social graph bit array 200. As non-limiting examples, the element may include a mail address or an identifier of each user or end devices. Further, server 120 may be configured to assign weights to social graph bit array 200 of end device 130 in accordance with social distance or frequency of communications on the SNS between end device 130 and other end devices 140. In some embodiments, for the purpose of assigning weights, server 120 may be configured to enter each element (e.g., a mail address or an identifier of respective one of other end devices 140) into from (k+1)-th hash function to (k+p)-th hash function. The 'p' may be an integer, and may be change depending on the social distance or frequency of communications on the SNS between end device 130 and respective one of other end devices 140. Further, server 120 may be configured to set a valid bit (e.g., one) into one or more slots of social graph bit array 200, which correspond to a result of the 'p' number of hash functions.

For example, as depicted in FIG. 2B, server 120 may be configured to add a first device element (e.g., a mail address of a first device among other end devices 140, such as "john@example.com") into social graph bit array 200. At this time, if the social distance between end device 130 and the first device is relatively close or frequency of communications on the SNS between end device 130 and the first device is relatively great (i.e., end device 130 and the first device contact each other on the SNS, frequently), server 120 may enter the first device element into relatively more hash functions. For example, server 120 may enter the first device element into from (k+1)-th hash function to (k+4)-th hash function. The result of (k+1)-th hash function with the first device element is five, the result of (k+2)-th hash function with the first device element is two, the result of (k+3)-th hash function with the first device element is 9998, and the result of (k+4)-th hash function with the first device element is seven.

Further, as depicted in FIG. 2B, server 120 may be configured to set a valid bit (e.g., one) into second slot 202, fifth slot 205, seventh slot 207 and 9998-th slot 209 of social graph bit array 200, which correspond to the result of the four hash functions.

Further, for example, as depicted in FIG. 2C, server 120 may be configured to add a second device element (e.g., a mail address of a second device among other end devices 140, such as "scott@example.com") into social graph bit array 200. If the social distance between end device 130 and the second device is relatively ordinary or frequency of communications on the SNS between end device 130 and the first device is relatively normal (i.e., end device 130 and the second device contact each other on the SNS, sometimes), server 120 may enter the second device element into relatively less hash functions. For example, server 120 may enter the second device element into from (k+1)-th hash function to (k+2)-th hash function. The result of (k+1)-th hash function with the second device element is one and the result of (k+2)-th hash function with the second device element is 9999.

Further, as depicted in FIG. 2C, server 120 may be configured to set a valid bit (e.g., one) into first slot 201 and 9999-th slot 210 of social graph bit array 200, which correspond to the result of the two hash functions.

Further, for example, as depicted in FIG. 2D, server 120 may be configured to add a third device element (e.g., a mail address of a third device among other end devices 140, such as "jack@example.com") into social graph bit array 200. If the social distance between end device 130 and the third device is relatively greater or frequency of communications on the SNS between end device 130 and the first device is relatively less (i.e., end device 130 and the third device contact each other on the SNS, rarely), server 120 may enter the third device element into minimum hash functions. For example, server 120 may enter the third device element into (k+1)-th hash function. The result of (k+1)-th hash function with the third device element is three.

Further, as depicted in FIG. 2D, server 120 may be configured to set a valid bit (e.g., one) into third slot 203 of social graph bit array 200, which corresponds to the result of the hash function.

As described above, server 120 may be configured to translate a social graph corresponding to end device 130 into social graph bit array 200 by setting or inserting valid bits into multiple slots that may correspond to results of hash functions, which are proportional to at least one of a number of acquaintances on the social graph or a frequency of interactions with the acquaintances.

FIG. 3 shows a schematic block diagram illustrating an example architecture for an end device, arranged in accordance with at least some embodiments described herein. As depicted in FIG. 3, end device 130 may include a bit array manager 310, a social relevance calculator 320, a device detector 330 and a social network manager 340. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of bit array manager 310, social relevance calculator 320, device detector 330 and social network manager 340 may be included in an instance of an application hosted on end device 130.

Bit array manager 310 may be configured to receive, from server 120, a social graph bit array of end device 130. Further, bit array manager 310 may be configured to cache and/or store the received social graph bit array in a memory. The social graph bit array may be a bit array to which a social graph corresponding to end device 130 on a social network service is translated by server 120.

The social graph bit array may have multiple slots. For example, two types of bit (e.g., one or zero) may be inserted or set in each slot of the social graph bit array. A valid bit (e.g., one) may be set into one or more slots of the social graph bit array, which correspond to a result of multiple hash functions with regard to at least one of acquaintances on the social graph or a frequency of interactions with the acquaintances. Thus, the social graph bit array of end device 130 may have multiple valid bits which are proportional to at least one of a number of the acquaintances on the social graph or a frequency of interactions with the acquaintances.

Bit array manager 310 may be further configured to receive social graph bit arrays of other end devices 140 from other end devices 140. Further, bit array manager 310 may be configured to transmit the social graph bit array of end device 130 to other end devices 140, periodically. Bit array manager 310 may be configured to receive/transmit the social graph bit arrays from/to other end devices 140 via a ultralow-voltage wireless network between end device 130 and other end devices 140. As non-limiting examples, the ultralow-voltage wireless network may include a Bluetooth Low Energy (BLE) network.

Social relevance calculator 320 may be configured to calculate a social relevance or a social distance on a social graph of end device 130 between end device 130 and respective one of other end devices 140, based on the social graph bit array of end device 130 and respective one of the social graph bit arrays of other end devices 140.

In some embodiments, social relevance calculator 320 may be configured to perform bitwise logical operations to the social graph bit array of end device 130 and respective one of the social graph bit arrays of other end devices 140 so as to calculate the social relevance. For example, but not as a limitation, the bitwise logical operations may include AND operation or XOR operation.

Further, social relevance calculator 320 may be configured to count a number of slots in which a valid bit (e.g., one) is set as a result of the bitwise logical operations.

Device detector 330 may be configured to determine whether the calculated social relevance is greater than a predetermined threshold value. For example, device detector 330 may be configured to determine whether the counted number of slots in which a valid bit (e.g., one) is set is greater than a predetermined threshold value. Device detector 330 may be further configured to detect one or more end devices having a social relevance greater than the predetermined threshold value from among other end devices 140.

Social network manager 340 may be configured to construct an ad-hoc social network that may connect end device 130 with the detected one or more end devices having a social relevance greater than the predetermined threshold value. Specifically, social network manager 340 may be configured to display identifiers of the detected one or more end devices on a display that may be part of, or communicatively coupled to, end device 130. In some embodiments, social network manager 340 may be configured to display the identifiers of the detected one or more end devices on the display in a descending order of the social relevance.

Further, social network manager 340 may be configured to receive a user input to select one or more of the displayed identifiers. Social network manager 340 may be configured to then construct an ad-hoc social network that may connect end device 130 and the one or more end devices, from among end devices 140, of which the identifiers are selected, based on the received user input.

Figure 4:
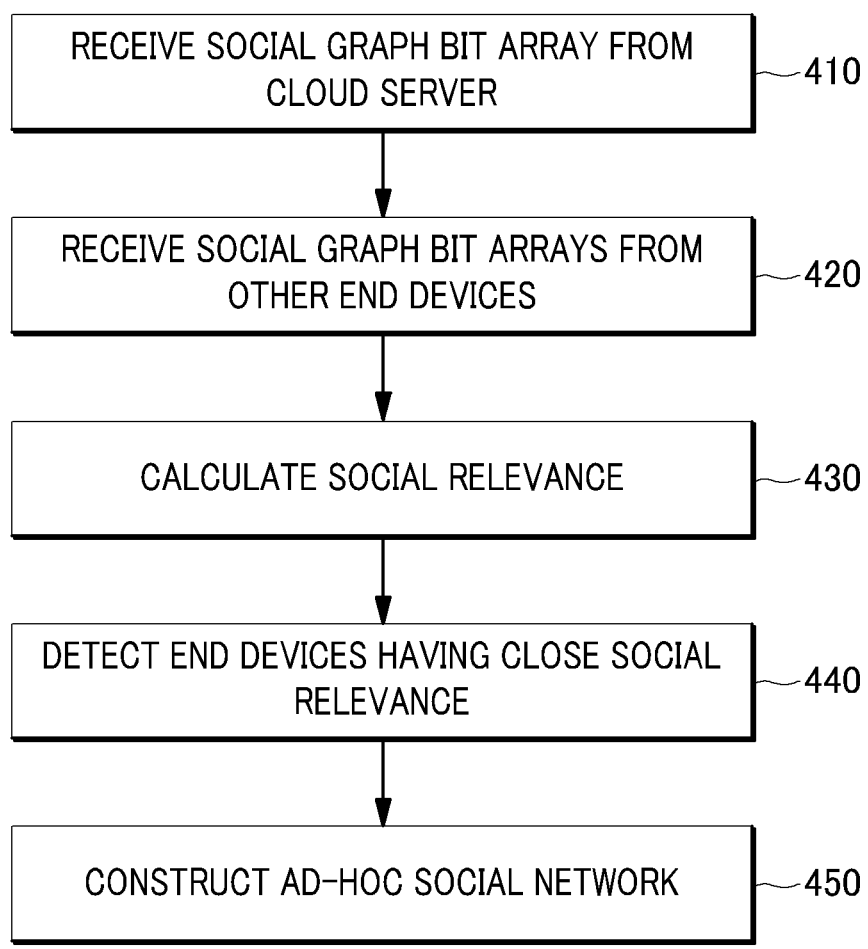
FIG. 4 schematically shows an example flow diagram of a process of an end device for constructing an ad-hoc social network, arranged in accordance with at least some embodiments described herein.

FIG. 4 schematically shows an example flow diagram of a process 400 of an end device 130 for constructing an ad-hoc social network, arranged in accordance with at least some embodiments described herein. The process in FIG. 4 may be implemented in environment 10 including server 120, end device 130 and multiple other end devices 140, as illustrated in FIG. 1. An example process may include one or more operations, actions, or functions as illustrated by one or more blocks 410, 420, 430, 440 and/or 450. Although illustrated as discrete blocks, various blocks may be divided into additional blocks, combined into fewer blocks, or eliminated, depending on the desired implementation. Processing may begin at block 410.

At block 410 (Receive Social Graph Bit Array From Cloud Server), end device 130 may receive, from cloud server 120, a social graph bit array of end device 130. Further, at block 410, end device 130 may cache and/or store the received social graph bit array in a memory. The social graph bit array may be a bit array into which a social graph corresponding to end device 130 on a social network service is translated. Processing may proceed from block 410 to block 420.

At block 420 (Receive Social Graph Bit Arrays From Other End Devices), end device 130 may receive social graph bit arrays of other end devices 140 from other end devices 140. End device 130 may receive each of the social graph bit arrays from other end devices 140 via an ultralow-voltage wireless network between end device 130 and other end devices 140. As non-limiting examples, the ultralow-voltage wireless network may include a Bluetooth Low Energy (BLE) network. Processing may proceed from block 420 to block 430.

At block 430 (Calculate Social Relevance), end device 130 may calculate a social relevance on a social graph of end device 130 between end device 130 and respective one of other end devices 140, based on the social graph bit array of end device 130 and the social graph bit arrays of other end devices 140.

In some embodiments, end device 130 may perform bitwise logical operations to the social graph bit array of end device 130 and respective one of the social graph bit arrays of other end devices 140 so as to calculate the social relevance. For example, but not as a limitation, the bitwise logical operations may include AND operation or XOR operation. Processing may proceed from block 430 to block 440.

At block 440 (Detect End Devices Having Close Social Relevance), end device 130 may detect one or more end devices having close social relevance with end device 130. In some embodiments, end device 130 may determine whether the calculated social relevance is greater than a predetermined threshold value. For example, end device 130 may count a number of slots in which a valid bit (e.g., one) is set as a result of the bitwise logical operations performed at block 430. Further, end device 130 may determine whether the counted number of slots in which a valid bit (e.g., one) is set is greater than a predetermined threshold value. Then, end device 130 may detect one or more end devices having a social relevance greater than the predetermined threshold value from among other end devices 140. Processing may proceed from block 440 to block 450.

At block 450 (Construct Ad-Hoc Social Network), end device 130 may construct an ad-hoc social network that may connect end device 130 with the detected one or more end devices having a social relevance greater than the predetermined threshold value. Specifically, at block 450, end device 130 display identifiers of the detected one or more end devices on a display that may be part of, or communicatively coupled to, end device 130. In some embodiments, end device 130 may display the identifiers of the detected one or more end devices on the display in a descending order of the social relevance.

Further, at block 450, end device 130 may receive a user input to select one or more of the displayed identifiers. End device 130 may construct an ad-hoc social network that may connect end device 130 and the one or more end devices, from among end devices 140, of which the identifiers are selected, based on the received user input.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
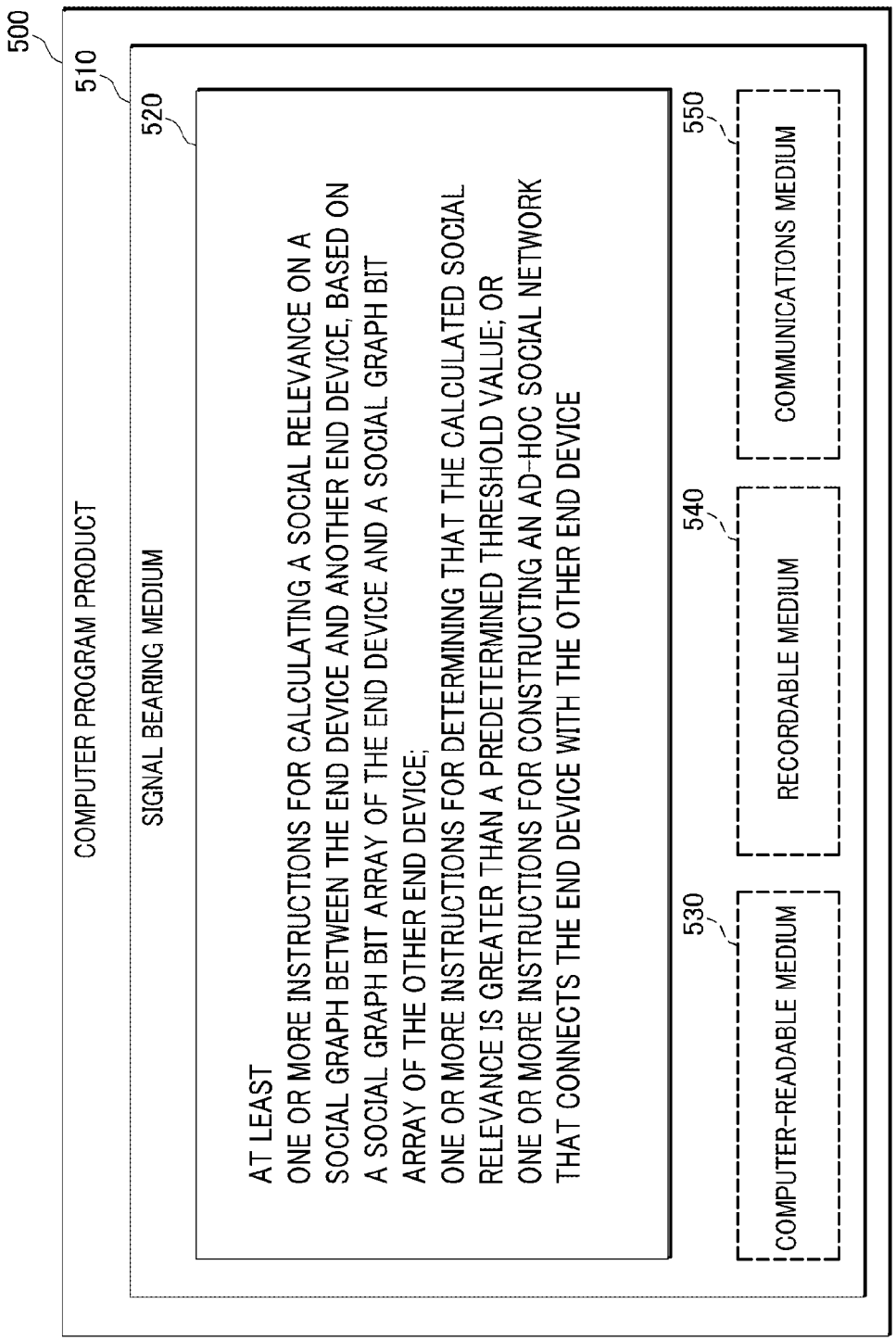
FIG. 5 illustrates computer program products that may be utilized to provide an ad-hoc social network constructing scheme, arranged in accordance with at least some embodiments described herein.

FIG. 5 illustrates computer program products that may be utilized to provide an ad-hoc social network constructing scheme, arranged in accordance with at least some embodiments described herein. Program product 500 may include a signal bearing medium 510. Signal bearing medium 510 may include one or more instructions 520 that, when executed by, for example, a processor, may provide the functionality described above with respect to FIGS. 1-4. By way of example, instructions 520 may include: one or more instructions for calculating a social relevance on a social graph between the end device and another end device, based on a social graph bit array of the end device and a social graph bit array of the other end device; one or more instructions for determining that the calculated social relevance is greater than a predetermined threshold value; or one or more instructions for constructing an ad-hoc social network that connects the end device with the other end device. Thus, for example, referring to FIG. 3, end device 130 may undertake one or more of the blocks shown in FIG. 4 in response to instructions 520.

In some implementations, signal bearing medium 510 may encompass a computer-readable medium 530, such as, but not limited to, a hard disk drive, a CD, a DVD, a digital tape, memory, etc. In some implementations, signal bearing medium 510 may encompass a recordable medium 540, such as, but not limited to, memory, read/write (R/W) CDs, R/W DVDs, etc. In some implementations, signal bearing medium 510 may encompass a communications medium 550, such as, but not limited to, a digital and/or an analog communication medium (e.g., a fiber optic cable, a waveguide, a wired communications link, a wireless communication link, etc.). Thus, for example, program product 500 may be conveyed to one or more modules of end device 130 by an RF signal bearing medium 510, where the signal bearing medium 510 is conveyed by a wireless communications medium 550 (e.g., a wireless communications medium conforming with the IEEE 802.11 standard).

Figure 6:
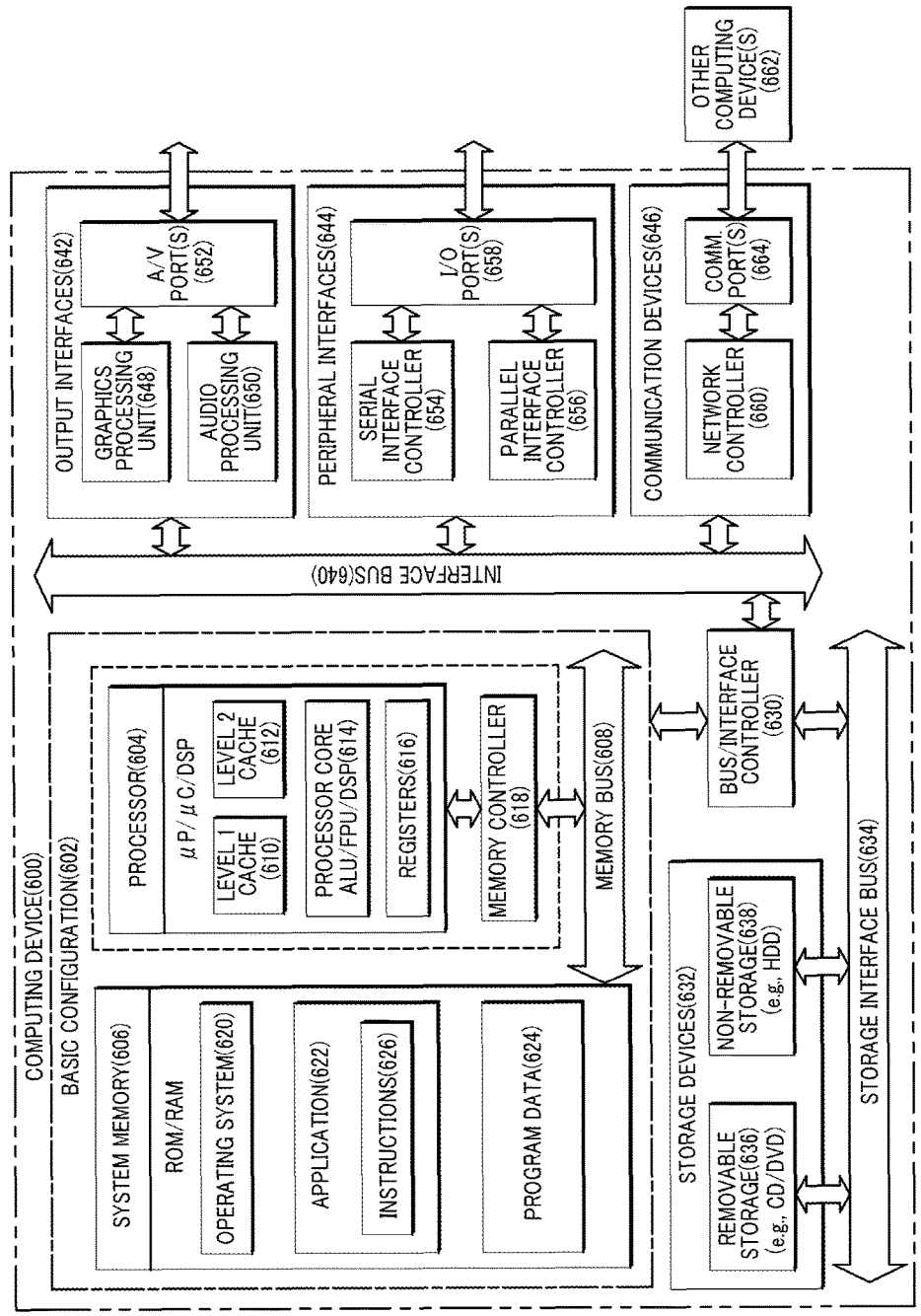
FIG. 6 is a block diagram illustrating an example computing device that may be utilized to provide an ad-hoc social network constructing scheme, arranged in accordance with at least some embodiments described herein.

FIG. 6 is a block diagram illustrating an example computing device that may be utilized to provide an ad-hoc social network constructing scheme, arranged in accordance with at least some embodiments described herein. In these examples, elements of computing device 600 may be arranged or configured for a device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, an application 622, and program data 624. Application 622 may include instructions 626 that may be arranged to perform the functions as described herein including the actions described with respect to end device architecture as shown in FIG. 3 or including the actions described with respect to the flow charts shown in FIG. 4. In some examples, application 622 may be arranged to operate with program data 624 on an operating system 620 such that the schemes for constructing an ad-hoc social network.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc."

is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an end device, the method comprising:
    receiving, by the end device, from a social network service (SNS) cloud server, a social graph bit array of the end device, wherein the social graph bit array of the end device is indicative of a frequency of social activities or social communications that involve the end device;
    receiving, by the end device, from an other end device, a social graph bit array of the other end device, wherein:
        the social graph bit array of the other end device is indicative of a frequency of social activities or social communications that involve the other end device,
        the social graph bit array of the end device is a bit array into which a social graph that corresponds to the end device is translated,
        the social graph bit array of the end device has a plurality of valid bits which are proportional to at least one of a number of acquaintances associated with the end device on the social graph or a frequency of interactions with the acquaintances,
        the social graph bit array of the end device includes a plurality of slots,
        the plurality of valid bits are set into the plurality of slots, and
        the plurality of valid bits correspond to a result of a plurality of hash functions with regard to at least one of the acquaintances or the interactions with the acquaintances;
    calculating, by the end device, a social relevance between the end device and the other end device on the social graph that corresponds to the end device, based on the social graph bit array of the end device and the social graph bit array of the other end device;
    determining, by the end device, whether the calculated social relevance is greater than a particular threshold value;
    after a determination that the calculated social relevance is greater than the particular threshold value, displaying an identifier of the other end device;
    receiving a user input to select the displayed identifier of the other end device; and
    constructing, by the end device, based on the received user input, an ad-hoc social network that connects the end device with the other end device.

2. The method of claim 1, further comprising: caching the social graph bit array of the end device in a memory.

3. The method of claim 1, wherein the calculating the social relevance includes applying a bitwise logical operation to the social graph bit array of the end device and the social graph bit array of the other end device.

4. The method of claim 1, wherein the receiving, from the other end device, the social graph bit array of the other end device includes receiving, from the other end device, the social graph bit array of the other end device via an ultralow-voltage wireless network between the end device and the other end device.

5. The method of claim 4, wherein the ultralow-voltage wireless network includes a bluetooth low energy (BLE) network.

6. The method of claim 1, wherein the identifier of the other end device includes a mail address of a user of the other end device.

7. The method claim 1, wherein:
    the calculating the social relevance between the end device and the other end device includes counting, in the social graph bit array of the end device, a number of the plurality of slots in which the plurality of valid bits are set, wherein a number of the plurality of valid bits is proportional to at least one of the number of acquaintances associated with the end device on the social graph or the frequency of interactions with the acquaintances, and
    the determining whether the calculated social relevance is greater than the particular threshold value includes determining whether the counted number of the plurality of slots is greater than the particular threshold value.

8. An end device, comprising:
a bit array manager configured to:
  receive, from a social network service (SNS) cloud server, a social graph bit array of the end device, wherein the social graph bit array of the end device is indicative of a frequency of social activities or social communications that involve the end device, and
  receive, from an other end device, a social graph bit array of the other end device, wherein:
    the social graph bit array of the other end device is indicative of a frequency of social activities or social communications that involve the other end device,
    a social graph that corresponds to the end device is translated into the social graph bit array of the end device,
    the social graph bit array of the end device has a plurality of valid bits which are proportional to at least one of a number of acquaintances associated with the end device on the social graph or a frequency of interactions with the acquaintances,
    the social graph bit array of the end device includes a plurality of slots,
    the plurality of valid bits are set into the plurality of slots, and
    the plurality of valid bits correspond to a result of a plurality of hash functions with regard to at least one of the acquaintances or the interactions with the acquaintances;
a social relevance calculator communicatively coupled to the bit array manager and configured to calculate a social relevance between the end device and the other end device on the social graph that corresponds to the end device, based on the social graph bit array of the end device and the social graph bit array of the other end device;
a device detector communicatively coupled to the social relevance calculator and configured to determine whether the calculated social relevance is greater than a particular threshold value; and
a social network manager communicatively coupled to the device detector and configured to, responsive to a determination that the calculated social relevance is greater than the particular threshold value, construct an ad-hoc social network that connects the end device with the other end device by:
  display of an identifier of the other end device,
  receipt of a user input to select the displayed identifier of the other end device, and
  construct the ad-hoc social network based on the received user input.

9. The end device of claim 8, wherein the bit array manager is further configured to cache the social graph bit array of the end device in a memory.

10. The end device of claim 8, wherein the bit array manager is further configured to transmit, to the other end device, the social graph bit array of the end device periodically.

11. The end device of claim 8, wherein the bit array manager is configured to receive the social graph bit array of the other end device via a bluetooth low energy (BLE) network between the end device and the other end device.

12. The end device of claim 8, wherein the social relevance calculator is further configured to perform a bitwise logical operation to the social graph bit array of the end device and the social graph bit array of the other end device.

13. The end device of claim 8, wherein:
  to calculate the social relevance between the end device and the other end device, the social relevance calculator is configured to count, in the social graph bit array of the end device, a number of slots in which the plurality of valid bits are set, and
  to determine whether the calculated social relevance is greater than the particular threshold value, the device detector is configured to determine whether the counted number of slots is greater than the particular threshold value.

14. A non-transitory computer-readable storage medium having stored thereon computer-executable instructions that, in response to execution, cause an end device to perform or control performance of operations to:
  receive, from a social network service (SNS) cloud server, a social graph bit array of the end device, wherein the social graph bit array of the end device is indicative of a frequency of social activities or social communications that involve the end device;
  receive, from an other end device, a social graph bit array of the other end device, wherein:
    the social graph bit array of the other end device is indicative of a frequency of social activities or social communications that involve the other end device,
    the social graph bit array of the end device is a bit array into which a social graph that corresponds to the end device is translated,
    the social graph bit array of the end device has a plurality of valid bits which are proportional to at least one of a number of acquaintances associated with the end device on the social graph or a frequency of interactions with the acquaintances,
    the social graph bit array of the end device includes a plurality of slots,
    the plurality of valid bits are set into the plurality of slots, and
    the plurality of valid bits correspond to a result of a plurality of hash functions with regard to at least one of the acquaintances or the interactions with the acquaintances;
  calculate a social relevance between the end device and the other end device on the social graph that corresponds to the end device, based on the social graph bit array of the end device and the social graph bit array of the other end device;
  determine whether the calculated social relevance is greater than a particular threshold value;
  after a determination that the calculated social relevance is greater than the particular threshold value, display an identifier of the other end device;
  receive a user input to select the displayed identifier of the other end device; and
  construct, based on the received user input, an ad-hoc social network that connects the end device with the other end device.

15. The non-transitory computer-readable storage medium of claim 14, wherein a length of the social graph bit array of the end device and a length of the social graph bit array of the other end device is in accordance with a number of users on the SNS.

* * * * *